(12) United States Patent
Zhang et al.

(10) Patent No.: US 12,358,184 B2
(45) Date of Patent: Jul. 15, 2025

(54) ELECTRONIC CONTROL SYSTEM BASED ON THREE-DIMENSIONAL (3D) CONCRETE PRINTING

(71) Applicants: Hebei Quantum Intelligent Technology Co., Ltd., Handan (CN); Hebei Shengzhuo Building Equipment Manufacturing Co., Ltd., Handan (CN)

(72) Inventors: Chao Zhang, Handan (CN); Jianjun Li, Handan (CN); Dinghui Li, Handan (CN); Yulong Wang, Handan (CN); Xiang Sun, Handan (CN); Bohang Wu, Handan (CN)

(73) Assignees: Hebei Quantum Intelligent Technology Co., Ltd., Handan (CN); Hebei Shengzhuo Building Equipment Manufacturing Co., Ltd., Handan (CN)

( * ) Notice: Subject to any disclaimer, the term of this patent is extended or adjusted under 35 U.S.C. 154(b) by 267 days.

(21) Appl. No.: 18/110,096

(22) Filed: Feb. 15, 2023

(65) Prior Publication Data

US 2024/0165847 A1 May 23, 2024

(30) Foreign Application Priority Data

Nov. 18, 2022 (CN) .......................... 202211443329.6

(51) Int. Cl.
*B28B 17/00* (2006.01)
*B28B 1/00* (2006.01)
(Continued)

(52) U.S. Cl.
CPC .......... *B28B 17/0081* (2013.01); *B28B 1/001* (2013.01); *B29C 64/386* (2017.08);
(Continued)

(58) Field of Classification Search
CPC ..... B29C 64/386; B29C 64/393; B33Y 50/00; B33Y 50/02

See application file for complete search history.

(56) References Cited

U.S. PATENT DOCUMENTS 9,314,969 B1 * 4/2016 Davis ...................... G05B 15/02
9,925,722 B2 * 3/2018 Martin .................. B29C 64/209
(Continued)

FOREIGN PATENT DOCUMENTS

CN          105364605 A  *  3/2016  ............. B23Q 15/24
CN          106346794 A  *  1/2017  ............. B28B 1/001
(Continued)

*Primary Examiner* — Atul P. Khare
(74) *Attorney, Agent, or Firm* — Kirk A. Wilson; Joseph T. Guy; Patent Filing Specialist Inc.

(57) ABSTRACT

The present disclosure relates to an electronic control system for 3D concrete printing, including: a control card, a three-way axis driver, a printing device head, a servo motor, and a monitoring system including a camera. The monitoring system includes a display module. The control card is configured to parse a 3D digital model of a to-be-printed object into a program instruction. The three-way axis driver is configured to receive the program instruction and in turn to drive the servo motor. The servo motor is configured to control movement of the printing device head. The camera is configured to acquire video data of a discharge port of the printing device head in real time. The monitoring system is configured to remotely monitor concrete discharge conditions of the printing device head according to the video data. The control card is connected with the three-way axis driver by an EtherCAT bus.

4 Claims, 1 Drawing Sheet

(51) Int. Cl.
  *B29C 64/386* (2017.01)
  *B33Y 50/00* (2015.01)
  *B33Y 10/00* (2015.01)
  *B33Y 30/00* (2015.01)
  *B33Y 50/02* (2015.01)
(52) U.S. Cl.
  CPC .............. *B33Y 50/00* (2014.12); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 10,259,137 | B2* | 4/2019 | Israel | B33Y 50/02 |
| 10,406,800 | B2* | 9/2019 | Kherat | B28B 1/001 |
| 10,543,619 | B2* | 1/2020 | Hack | E04B 2/845 |
| 10,688,683 | B2* | 6/2020 | Giles | E04G 11/20 |
| 10,695,973 | B2* | 6/2020 | Boyd, IV | B29C 64/209 |
| 10,898,969 | B2* | 1/2021 | Kanko | B29C 64/393 |
| 11,590,711 | B2* | 2/2023 | Nikshi | E04G 21/0463 |
| 11,919,193 | B2* | 3/2024 | Kenny | B33Y 50/02 |
| 2014/0252668 | A1* | 9/2014 | Austin | B28B 3/20 |
| | | | | 425/375 |
| 2018/0345533 | A1* | 12/2018 | Hernandez | E04B 1/3505 |
| 2020/0048893 | A1* | 2/2020 | Martinez | E04B 1/3505 |
| 2020/0307017 | A1* | 10/2020 | Schubart | B28B 17/02 |
| 2022/0268039 | A1* | 8/2022 | Ford | G06F 30/17 |

FOREIGN PATENT DOCUMENTS

| | | | | |
|---|---|---|---|---|
| CN | 109537455 A | * | 3/2019 | ............. E01D 21/00 |
| CN | 111923187 A | * | 11/2020 | ............. B33Y 30/00 |
| CN | 112622260 A | * | 4/2021 | ........... B29C 64/118 |

* cited by examiner

(54) ELECTRONIC CONTROL SYSTEM BASED ON THREE-DIMENSIONAL (3D) CONCRETE PRINTING

CROSS REFERENCE TO RELATED APPLICATION

This patent application claims the benefit and priority of Chinese Patent Application No. 202211443329.6, filed with the China National Intellectual Property Administration on Nov. 18, 2022, the disclosure of which is incorporated by reference herein in its entirety as part of the present application.

TECHNICAL FIELD

The present disclosure relates to the technical field of three-dimensional (3D) concrete printing, and in particular, to an electronic control system for 3D concrete printing.

BACKGROUND

The current 3D concrete printing technology has the problem of inaccurate position control. Therefore, for some complex anisotropic structures and building structures with complex joints, such printing technology increases the printing time, increases the consumables, even leads to printing failure, and prints out defective products or waste products.

SUMMARY

An objective of the present disclosure is to provide an electronic control system for 3D concrete printing, which improves the accuracy of 3D concrete printing.

To achieve the above objective, the present disclosure provides the following solutions:

An electronic control system for 3D concrete printing includes: a control card, a three-way axis driver, a printing device head, a servo motor, a camera and a monitoring system.

The control card is configured to parse a 3D digital model of a to-be-printed object into a program instruction.

The three-way axis driver is configured to receive the program instruction and in turn to drive the servo motor.

The servo motor is configured to control movement of the printing device head.

The camera is configured to acquire video data of a discharge port of the printing device head in real time.

The monitoring system is configured to remotely monitor concrete discharge conditions of the printing device head according to the video data.

The control card is connected with the three-way axis driver by an EtherCAT bus, and the control card adopts distributed control for the three-way axis driver.

Optionally, the electronic control system for 3D concrete printing further includes a first Z-axis control box, a second Z-axis control box, a third Z-axis control box, a first Y-axis control box, an X-axis and head control box, a second Y-axis control box, a fourth Z-axis control box, a fifth Z-axis control box, and a sixth Z-axis control box that are all connected with the control card and the three-way axis driver.

The first Z-axis control box, the second Z-axis control box, the third Z-axis control box, the fourth Z-axis control box, the fifth Z-axis control box, and the sixth Z-axis control box synchronously control Z-axis movement of the printing device head.

The first Y-axis control box and the second Y-axis control box synchronously move to control Y-axis movement of the printing device head.

The X-axis and head control box controls X-axis movement of the printing device head, controls a discharge speed of the discharge port of the printing device head, and controls a discharge direction of the discharge port of the printing device head.

Optionally, the electronic control system for 3D concrete printing further includes a power supply module. The power supply module includes a power supply and a filter, a time relay and a circuit breaker connected with the power supply.

Optionally, the electronic control system for 3D concrete printing further includes a heat exhaust fan, configured to dissipate heat for the electronic control system for 3D concrete printing.

Optionally, the control card includes a G code parsing unit and a program instruction generation unit.

The G code parsing unit is configured to parse the 3D digital model of the to-be-printed object into a G code.

The program instruction generation unit is configured to convert the G code into the program instruction for controlling the movement of the printing device head.

Optionally, the electronic control system for 3D concrete printing further includes an R-axis control box. The R-axis control box is connected with the control card and the three-way axis driver, and the R-axis control box is configured to control discharge of the printing device head.

Optionally, the electronic control system for 3D concrete printing further includes a lubrication detection system. The lubrication detection system is connected with the monitoring system. The lubrication detection system is configured to detect whether the servo motor is short of lubricating oil.

Optionally, the electronic control system for 3D concrete printing further includes an alarm device and a limit switch. Both the alarm device and the limit switch are connected with the control card, and the limit switch is arranged in each of X-axis, Y-axis and Z-axis movement directions of the printing device head.

When a limit signal sent by the limit switch is received, the limit signal is sent to the alarm device that is configured to send an alarm signal.

According to specific embodiments provided by the present disclosure, the present disclosure discloses the following technical effects:

The control card of the present disclosure is connected with the three-way axis driver by the EtherCAT bus, and the control card adopts distributed control for the three-way axis driver, which improves accuracy and reliability of 3D concrete printing.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an electronic control system for 3D concrete printing, which improves the accuracy of 3D concrete printing.

In order to make the above objectives, features and advantages of the present disclosure more obvious and understandable, the present disclosure is further described in detail in combination with the attached drawings and specific embodiments.

Figure 1:
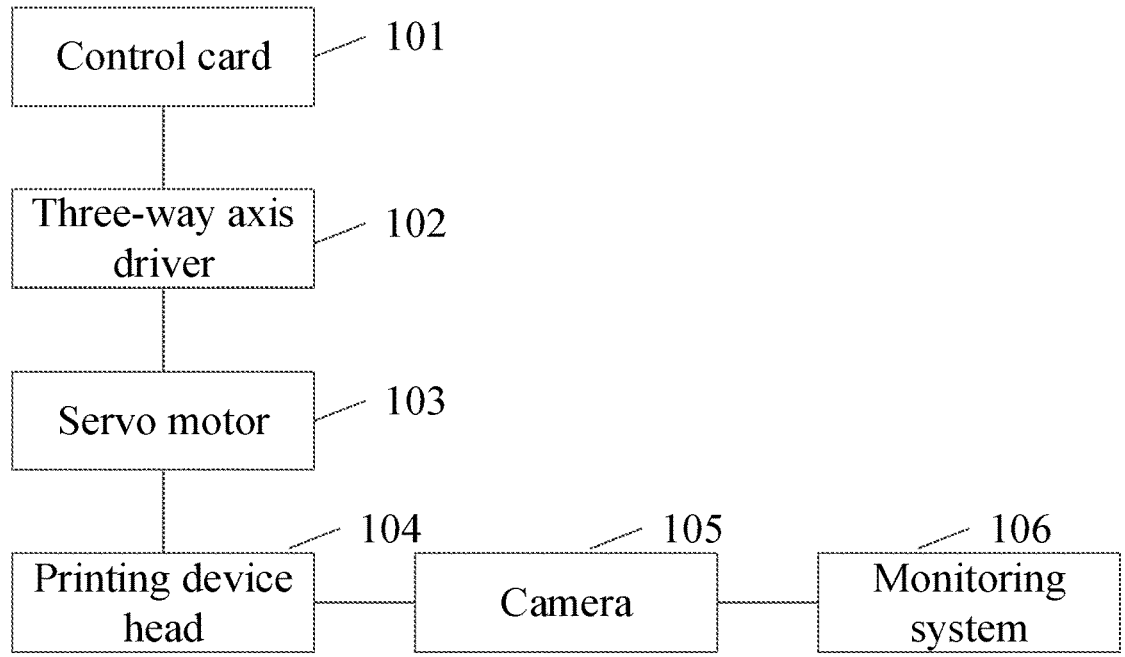
FIG. 1 is a schematic structural diagram of an electronic control system for 3D concrete printing of the present disclosure.

FIG. 1 is a schematic structural diagram of an electronic control system for 3D concrete printing of the present disclosure. As shown in FIG. 1, the electronic control system for 3D concrete printing includes: a control card, a three-way axis driver, a printing device head, a servo motor, a camera and a monitoring system.

The control card is configured to parse a 3D digital model of a to-be-printed object into a program instruction.

The to-be-printed object includes a building.

The control card is responsible for receiving an instruction transmitted by software and parsing and transmitting the instruction to the three-way axis driver.

The control card includes a G code parsing unit and a program instruction generation unit.

The G code parsing unit is configured to parse the 3D digital model of the to-be-printed object into a G code, specifically, cutting the 3D digital model and convert the cut image into a G code.

The program instruction generation unit is configured to convert the G code into the program instruction for controlling the movement of the printing device head, so as to print the building by superimposing concrete materials layer by layer.

Buildings obtained by 3D concrete printing are more efficient, intelligent and environmentally friendly than ordinary artificial buildings.

The control card is connected and communicated with the three-way axis driver through the gigabit network cable. According to the input parameters, the three-way axis driver is matched to a certain axis that needs to be controlled for communication connection. The control instruction (program instruction) includes the acceleration, deceleration, speed and moving distance of the axis, so as to accurately move the printer head to the required position.

The three-way axis driver is further configured to control the running or stopping of the servo motor.

The program instruction further includes path information generated from coordinates extracted from the 3D digital model.

The control card is further configured to parse the dxf standard format file of the input computer aided design (CAD) graphic, and parse out the point coordinate data of the graphics from the dxf standard format file. At present, the graphic forms that can be parsed are: line segment, circle, arc, and polyline. Single graphics or multiple graphics are also supported.

After obtaining the point coordinate data after graph analysis, the control card performs data processing: converting the origin coordinate data into 2D display graph data, and converting the 2D display graph data into the actual position data printed.

The printed actual position data after conversion is converted into pulse data according to the mechanical data and sent to the three-way axis driver for corresponding operation. According to the data, the rotation distance of the corresponding drive shaft is controlled and the corresponding movement distance is realized.

The actual position data printed is a set of point coordinates, and each point coordinate has an X value and a Y value. The X and Y values are the moving pulse data corresponding to X and Y axes. The positive number indicates movement in the positive direction and the negative number indicates movement in the negative direction. According to the data of the set of all point coordinates, based on the pulse values corresponding to the X and Y axes, the control board sends a signal to the motor for motor rotation. When the distance of motor rotation is equal to the received pulse value, the control board sends a rotation stopping signal, and the motor rotates exactly to a position corresponding to the X and Y values.

The three-way axis driver is configured to receive the program instruction and in turn to drive the servo motor.

The servo motor is configured to control movement of the printing device head.

The camera is configured to acquire video data of a discharge port of the printing device head in real time.

The camera is arranged in each of X-axis, Y-axis and Z-axis movement directions of the printing device head.

The monitoring system is configured to remotely monitor concrete discharge conditions of the printing device head according to the video data, so as to realize remote monitoring of the field staff. The concrete discharge conditions include a discharge speed.

The control card is connected with the three-way axis driver by an EtherCAT bus, and the control card adopts distributed control for the three-way axis driver.

Figure 2:
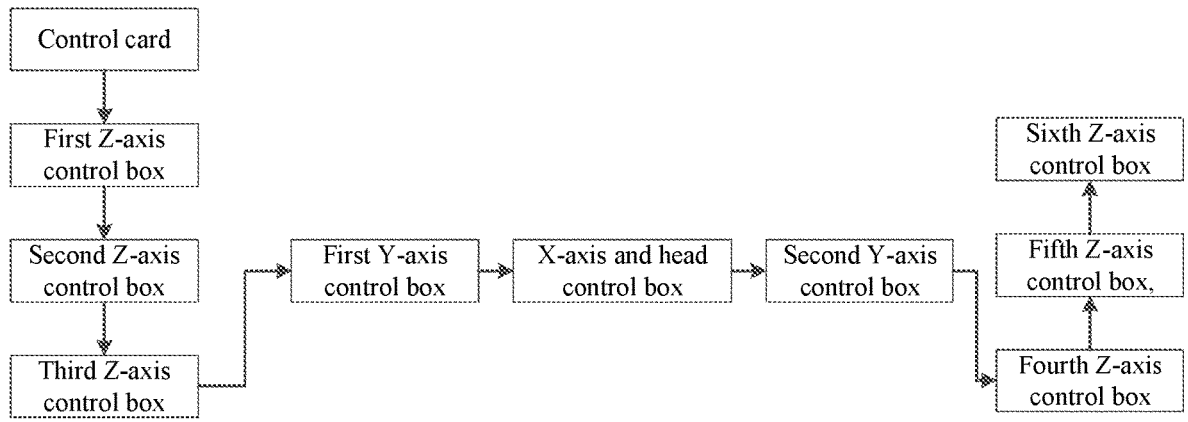
FIG. 2 is a network topology diagram of distributed control of control boxes of the present disclosure.

The electronic control system for 3D concrete printing further includes a first Z-axis control box, a second Z-axis control box, a third Z-axis control box, a first Y-axis control box, an X-axis and head control box, a second Y-axis control box, a fourth Z-axis control box, a fifth Z-axis control box, and a sixth Z-axis control box that are all connected with the control card and the three-way axis driver, as shown in FIG. 2.

The first Z-axis control box, the second Z-axis control box, the third Z-axis control box, the fourth Z-axis control box, the fifth Z-axis control box, and the sixth Z-axis control box are configured to receive a Z-axis movement command issued by the control card, so as to synchronously control Z-axis movement of the printing device head.

The first Y-axis control box and the second Y-axis control box are configured to receive a Y-axis movement command issued by the control card, so as to synchronously move to control Y-axis movement of the printing device head.

The X-axis and head control box is configured to receive an X-axis movement command issued by the control card, so as to control X-axis movement of the printing device head, control a discharge speed of the discharge port of the printing device head, and control a discharge direction of the discharge port of the printing device head.

Each of the first Z-axis control box, the second Z-axis control box, the third Z-axis control box, the first Y-axis control box, the second Y-axis control box, the fourth Z-axis control box, the fifth Z-axis control box and the sixth Z-axis control box is connected with a servo motor.

The X-axis and head control box is connected with three servo motors. The first servo motor drives the X-axis movement of the printing device head. The second servo motor drives the discharge speed of the discharge port of the printing device head. The third servo motor drives the discharge direction of the discharge port of the printing device head.

The electronic control system for 3D concrete printing further includes a power supply module. The power supply module includes a power supply and a filter, a time relay and a circuit breaker connected with the power supply.

The electronic control system for 3D concrete printing further includes a heat exhaust fan, configured to dissipate heat for the electronic control system for 3D concrete printing.

The electronic control system for 3D concrete printing further includes an R-axis control box. The R-axis control box is connected with the control card and the three-way axis driver, and the R-axis control box is configured to control discharge of the printing device head.

The electronic control system for 3D concrete printing further includes a lubrication detection system. The lubrication detection system is connected with the monitoring system. The lubrication detection system is configured to detect whether the servo motor is short of lubricating oil.

The electronic control system for 3D concrete printing further includes an alarm device and limit switches. Both the alarm device and the limit switches are connected with the control card, and the limit switches are arranged in each of X-axis, Y-axis and Z-axis movement directions of the printing device head.

When a limit signal sent by one of the limit switches is received by the control card, the limit signal is sent to the alarm device that is configured to send an alarm signal.

The electronic control system for 3D concrete printing further includes a field emergency stop device connected with the control card.

Each embodiment of the present specification is described in a progressive manner, each embodiment focuses on the difference from other embodiments, and the same and similar parts between the embodiments may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. An electronic control system for three-dimensional (3D) concrete printing, the electronic control system comprising: a control card, a three-way axis driver, a printing device head, a servo motor, and a monitoring system comprising a camera, wherein:
   the control card is configured to parse a 3D digital model of a to-be-printed object into a program instruction;
   the three-way axis driver is configured to receive the program instruction from the control card and in turn to drive the servo motor;
   the servo motor is configured to control movement of the printing device head for printing the object;
   the camera is configured to acquire video data of a discharge port of the printing device head in real time;
   the monitoring system is configured to remotely monitor concrete discharge conditions of the printing device head according to the video data;
   the control card is connected with the three-way axis driver by an EtherCAT bus; and
   the control card controls the three-way axis driver,
   wherein the electronic control system further comprises a power supply module, wherein the power supply module comprises a power supply, a filter, a time relay and a circuit breaker; the filter, the time relay and the circuit breaker are connected with the power supply.

2. The electronic control system for 3D concrete printing according to claim 1, further comprising a heat exhaust fan; configured to dissipate heat for the electronic control system for 3D concrete printing.

3. The electronic control system for 3D concrete printing according to claim 1, wherein the control card comprises a G code parsing unit and a program instruction generation unit;
   the G code parsing unit is configured to parse the 3D digital model of the to-be-printed object into a G code; and
   the program instruction generation unit is configured to convert the G code into the program instruction for controlling a movement of the printing device head.

4. The electronic control system for 3D concrete printing according to claim 1, further comprising an alarm device configured to generate an alarm signal and a limit switch configured to generate a limit signal, wherein both the alarm device and the limit switch are connected with the control card, and the limit switch is arranged in each of X-axis, Y-axis and Z-axis movement directions of the printing device head; and
   wherein the control card is configured to transmit the limit signal from the limit switch to the alarm device.

* * * * *